United States Patent
Hechtman

(10) Patent No.: US 11,537,939 B2
(45) Date of Patent: Dec. 27, 2022

(54) RESHAPE AND BROADCAST OPTIMIZATIONS TO AVOID UNNECESSARY DATA MOVEMENT

(71) Applicant: Google LLC, Mountain View, CA (US)

(72) Inventor: Blake Alan Hechtman, Mountain View, CA (US)

(73) Assignee: Google LLC, Mountain View, CA (US)

(\*) Notice: Subject to any disclaimer, the term of this patent is extended or adjusted under 35 U.S.C. 154(b) by 260 days.

(21) Appl. No.: 16/402,981

(22) Filed: May 3, 2019

(65) Prior Publication Data
US 2020/0349465 A1    Nov. 5, 2020

(51) Int. Cl.
*G06N 20/00* (2019.01)

(52) U.S. Cl.
CPC .................... *G06N 20/00* (2019.01)

(58) Field of Classification Search
CPC .............................. G06N 20/00; G06F 8/4434
USPC ......................................................... 706/12
See application file for complete search history.

(56) References Cited

U.S. PATENT DOCUMENTS

| | | | |
|---|---|---|---|
| 2006/0001673 A1\* | 1/2006 | Brand | G06T 13/40 345/582 |
| 2018/0107456 A1\* | 4/2018 | Bruestle | G06F 17/12 |
| 2018/0341486 A1\* | 11/2018 | Fowers | G06F 9/30036 |
| 2019/0087726 A1\* | 3/2019 | Greenblatt | G06N 5/046 |
| 2020/0117993 A1\* | 4/2020 | Martinez-Canales | G06K 9/6262 |
| 2020/0280322 A1\* | 9/2020 | Horesh | H03M 7/3062 |
| 2020/0285949 A1\* | 9/2020 | Baum | G06N 3/084 |
| 2021/0019626 A1\* | 1/2021 | Shazeer | G06K 9/6256 |

FOREIGN PATENT DOCUMENTS

JP    2006018828 A    1/2006

OTHER PUBLICATIONS

The Deep Learning Compiler: A Comprehensive Survey Li et al., vol. 1, No. 1 Aug. 28, 2020 (Year: 2020).\*
DeepLizard. ArgMaxand Reduction Ops—Tensors for Deep Learning with PyTorch. Oct. 13, 2018 (Year: 2018).\*
Cho et al. An FPGA Based SIMD Processor With a Vector Memory Unit. ISCAS 2006 (Year: 2006).\*
Li et al, "The Deep Learning Compiler: A Comprehensive Survey" arXiv, Feb. 2020, 29 pages.
PCT International Search Report and Written Opinion in International Application No. PCT/US2020/030752, dated Aug. 31, 2020, 13 pages.
PCT International Preliminary Report on Patentability in International Application No. PCT/US2020/030752, dated Nov. 18, 2021, 8 pages.
Office Action in Indian Appln. No. 202127047656, dated May 6, 2022, 7 pages (with English Translation).

\* cited by examiner

*Primary Examiner* — Michael J Huntley
*Assistant Examiner* — Robert Bejcek, II
(74) *Attorney, Agent, or Firm* — Fish & Richardson P.C.

(57) ABSTRACT

Methods, systems, and apparatus, including computer programs encoded on computer storage media, for transforming patterns of operations on tensors in a computational graph to reduce the memory burden incurred when reshape operations are performed, in particular when deployed to hardware platforms that have vector instructions or vector memory requiring alignment of operands.

15 Claims, 2 Drawing Sheets

RESHAPE AND BROADCAST OPTIMIZATIONS TO AVOID UNNECESSARY DATA MOVEMENT

BACKGROUND

The TensorFlow library can be used to create machine learning models, e.g., recurrent neural network ("RNN") models, convolutional neural network ("CNN") models, feedforward neural network models, and random forest models. (TensorFlow is described in Abadi et al., Tensor-Flow: A system for Large-Scale Design and Implementation (OSDI '16), pp. 265-283, Nov. 2-4, 2016. The software is available from https://tensorflow.org.)

The TensorFlow library can be used to represent machine learning models as TensorFlow graphs. Each node in a TensorFlow graph represents an operation. Each edge in a TensorFlow graph is directed and represents a flow of data that is into or out of the node into which the edge is connected. The data is in the form of a tensor of zero or more dimensions, in which each element has the same data type, e.g., 32-bit integer, double-length floating point, or string. A tensor is represented externally by vectors in paired brackets "[ ]". For example, a one-dimensional (1D) tensor, also called a vector, of 3 elements would be represented as [1, 2, 3]. A zero-dimensional tensor is a scalar. A two-dimensional (2D) tensor would be represented as [[1, 2, 3], [4, 5, 6]]. The rank of this tensor, i.e., the number of dimensions or the number of indices required to uniquely select each element of the tensor, is two. The shape of this tensor is [2, 3]. Two is the number of elements in the zero-th dimension, namely, the two vectors (1D tensors) [1, 2, 3] and [4, 5, 6]; and three is the number of elements in the first dimension; that is, each of the vectors [1, 2, 3] and [4, 5, 6] have three elements. The shape of a tensor is itself a 1D tensor. As is conventional in many programming contexts, the numbering of dimensions starts with zero.

In this specification, the examples will be expressed using the Python API for constructing and executing a TensorFlow graph. The TensorFlow module can be loaded thus:
 import tensorflow as tf The TensorFlow operations include shape, reshape, broadcast, and reduce operations. These will be described below, omitting parameters and aspects from the description that are not material to this specification.

When executed, the shape operation returns the shape, i.e., the dimensions, of an input tensor as a 1D tensor. In the following example:
 X=tf.constant([[[1, 1, 1], [2, 2, 2]], [[3, 3, 3], [4, 4, 4]]])
 tf.shape(X)
the shape operations returns the tensor [2, 2, 3], which represents the dimensions of tensor X.

When executed, the reshape operation returns a tensor having the same element values in the same order as the input tensor, but with a shape that is defined by a shape tensor input. In the following example,
 X=tf.constant([[[1, 1], [2, 2]], [[3, 3], [4, 4]]]) tf.reshape (X, [2, 4])
the reshape operation receives tensor X and a one-dimensional tensor [2, 4] representing a desired shape as input parameters. The reshape operation returns a tensor [[1, 1, 2, 2], [3, 3, 4, 4]] that has the same elements as the input tensor X and has the desired shape, namely [2, 4]. The desired shape input to a reshape operation can have more or fewer dimensions than the input tensor has.

The broadcast operations include broadcast to. Broadcasting is the process of making arrays that have compatible shapes for arithmetic operations. Two shapes are compatible if for each corresponding dimension pair of their shapes, the dimensions are either equal or one of them is one. When a tensor is broadcast to a shape, the operation starts with the trailing dimensions and works its way forward.

Thus, when executed, the broadcast to operation returns a tensor that is the input tensor replicated as many times as need until the requested, specified shape is reached. In the following example:
 V=tf.constant([7, 8])
 tf.broadcast to(V, [2, 3])
the broadcast to operation receives as input a tensor V and a tensor [2, 3] specifying the desired shape. It returns a tensor [[7, 7, 7], [8, 8, 8]], which has the desired shape.

The reduce operations include reduce_all, reduce_any, reduce_sum, and reduce_mean. The reduce operations return an output tensor that generally has a smaller rank and a smaller number of elements than the input tensor.

The reduce operations receive an input tensor and an axis tensor. The elements of the axis tensor identify dimensions of the shape of the input tensor. The reduce operations reduce the input tensor along the dimensions specified by the axis tensor. For example, in
 X=tf.constant([[1, 1, 1], [1, 1, 1]])
the shape of X is [2, 3], i.e., X is a tensor with two rows and three columns:
 1 1 1
 1 1 1
To take the specific reduce operation reduce_sum as an example, with an axis tensor [0], which identifies the rows, i.e., the zero-th dimension of X, the operation
 tf.reduce_sum(x, [0])
when executed reduces the tensor along zero-th dimension (the rows) and sums the rows [1, 1, 1]+[1, 1, 1] to return [2, 2, 2]. When
 tf.reduce_sum(x, [1])
is executed, the reduction is along the first dimension (the columns) and sums the columns [1, 1]+[1,1]+[1, 1] to return [3, 3]. When
 tf.reduce_sum(x, [0, 1])
is executed, the reduction is along both dimensions and sums to return the scalar (0D tensor) 6.

The shape of a tensor returned by a reduce operation has the dimensions of the input tensor without the indices specified by the axis tensor.

Other reduce operations return tensors whose elements' values are computed by other operations. For example, the reduce_all operation computes the logical AND, the reduce_any operation computes the logical OR, the reduce_mean operation computes the mean, and so on.

In some scenarios, a user uses a compiler, e.g., a Just-in-Time ("JIT") compiler, to compile TensorFlow graphs to graphs to input into an XLA compiler. (A JIT compiler is described in https://www.tensorflow.org/x1a/jit). The input language to XLA is called "HLO IR", or just HLO (High Level Optimizer). The XLA compiler takes graphs, i.e., computations, defined in HLO and compiles them into machine instructions for various architectures, performing target-dependent optimizations and generating target-dependent code.

The nodes in an HLO graph represents operations. Each edge in the graph is directed and represents a flow of data that is into or out of the node to which the edge is connected. This data is in the form of a tensor. The operations represented in an HLO graph correspond to operations in a TensorFlow flow from which the HLO graph was generated. In particular, an HLO graph can include reshape, reduce, and broadcast operations.

The binaries generated by the XLA compiler are deployed onto hardware and executed by the specific processors of the hardware. Some processors implement instructions that operate on vectors. In order for a processor to perform vector instructions that operate on tensor data, the tensors must be stored such that each of the tensor's vectors that will be operated on by vector instructions are aligned on a vector boundary, as specified for the processor.

For example, if a reshape operation receives a tensor [1, 2, 3, 4, 5, 6, 7, 8, 9] and a tensor specifying a shape [3, 3] as input parameters, the resulting tensor [[1, 2, 3], [4, 5, 6], [7, 8, 9]] has three vectors [1, 2, 3], [4, 5, 6], and [7, 8, 9] that must be moved so that they are aligned on a vector boundary if the vectors do not happen to be aligned on a vector boundary as required by the specific processor of the hardware.

SUMMARY

This specification describes optimization techniques that can be implemented in an XLA compiler to reduce the memory burden of particular sequences of operations that include a reshape operation.

These optimizations are particularly helpful in operation sequences that implement machine learning techniques like group normalization (https://arxiv.org/pdf/1803.08494.pdf) and ghost batch normalization (https://arxiv.org/pdf/1705.08741.pdf). In a direct implementation of such machine learning techniques, the input tensor is reshaped to a higher number of dimensions. Then a reduction is performed across some dimensions changed by the reshape and other dimensions not changed by the reshape. The derivative of the reduce and reshape is a broadcast and that is reshaped back to the original shape. The broadcast is also made into some dimensions changed by the reshape and some dimensions not changed by the reshape. The reshape operations do nothing to the data on platforms with a linear address space. However, on platforms with a vector memory, reshapes will in general change shape alignment relative to the vector memory, requiring data to be moved. This specification describes optimizations that reduce the sizes of tensors that needs to be moved to achieve alignment with respect to a vector memory.

BRIEF DESCRIPTION OF THE DRAWINGS

Like reference numbers and designations in the various drawings indicate like elements.

DETAILED DESCRIPTION

Figure 1:
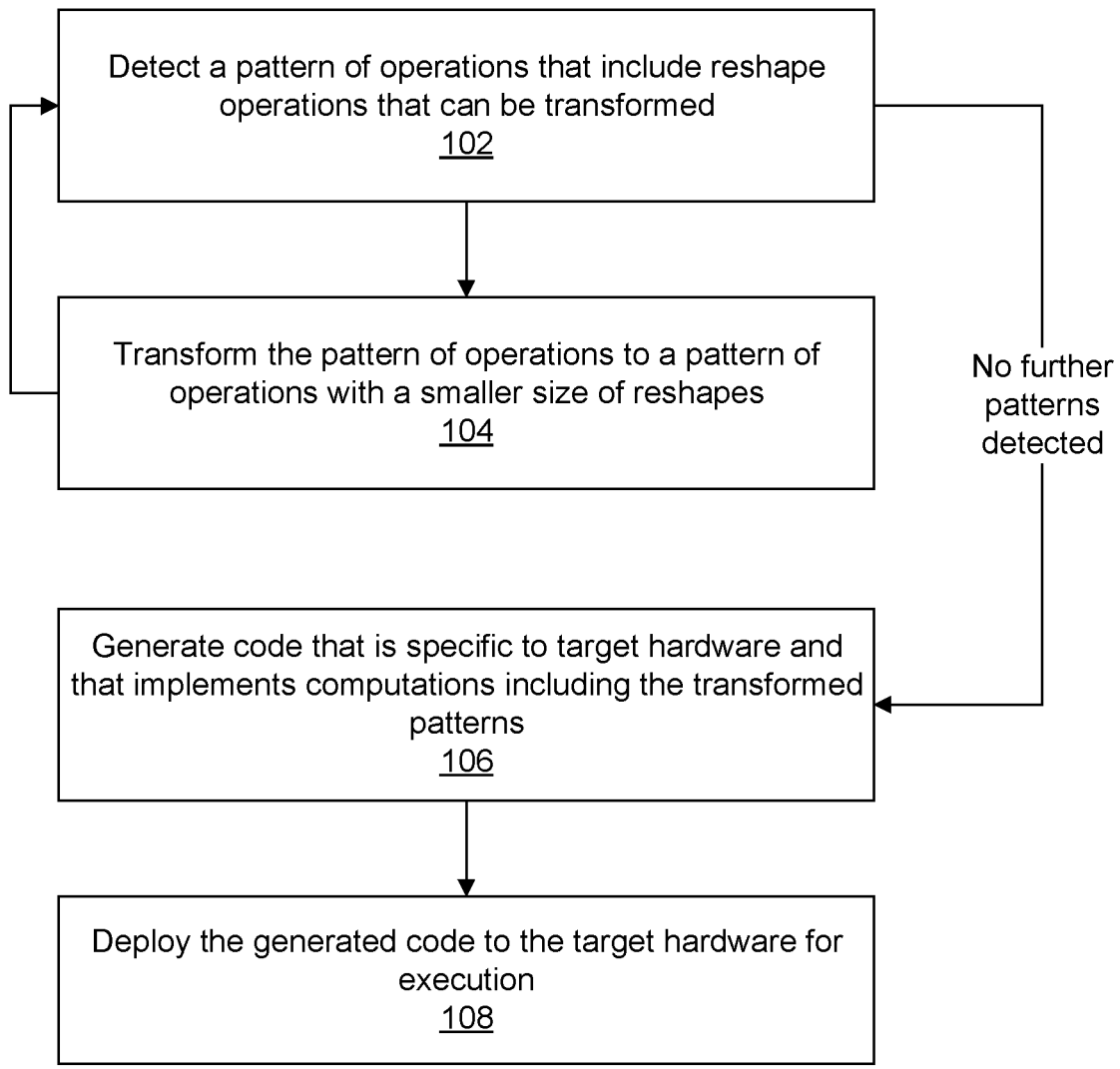
FIG. 1 is a flowchart illustrating an example process that implements compiler transformations that detect a pattern of operations that include reshape operations that can be transformed to minimize the size of the reshape operations.

FIG. 1 is a flowchart illustrating an example process 100 that implements compiler transformations that detect a pattern of operations that include reshape operations that can be transformed to minimize the size of the reshape operations. The compiler transformations will be described with reference to an XLA compiler and to patterns of reshape, reduce, and broadcast operations in a computation graph. The compiler and the process can be implemented on and performed by a system of one or more computers in one or more locations.

The process detects a pattern of operations that include reshape operations that can be transformed (102). This pattern can be a pattern of operations in an XLA graph. One such pattern is reduce(reshape(X)) when one or more dimensions are reduced that are not changed in the reshape. In this pattern, a reshape operation is performed on an input tensor X and returns a tensor that is the input to a reduce operation.

The process transforms the operations to a pattern of operations with a smaller size of reshapes (104). For example, operations fitting the reduce(reshape(X)) pattern mentioned above are transformed to a reduce(reshape(reduce(X))) pattern of operations. This transformation increases the amount of compute by adding an additional reduce; but it has the important advantage of reducing the total size of reshapes, since both computations have one reshape and the latter reshape has had dimensions reduced and as a result is strictly smaller in number of elements than the original. The process continues to detect and transform until no further patterns are detected, at which point the compiler generates code that is specific to target hardware and that implements computations including the transformed patterns (106). Then the compiler, or other element of a TensorFlow infrastructure, deploys the generated code to the target hardware for execution (108).

An example broadcast version of another pattern that can be optimized is reshape(add(reshape(X), broadcast(Y)) where the input shape of tensor X is the same as the output shape of the tensor returned by the outermost reshape. This pattern of operations is transformed to add(X, broadcast (reshape(broadcast(Y)))), which has both fewer reshapes in total and has a reshape of smaller size, since the output of the reshape is broadcasted into a larger shape because it has extra dimensions.

This transformation can apply to an arbitrary subcomputation that matches the following pattern:
reshape(
  f(
    g(reshape(G)),
    h(reshape(H)), . . . ,
    a(broadcast(A)),
    b(broadcast(B)
    )
  ),
which is transformed by the optimization to
f(
  g(G),
  h(H), . . . ,
  a(broadcast(reshape(broadcast(A))),
  b(broadcast(reshape(broadcast(B)))

The lower-case letters f, g, h, a, and b represent mathematical operations in the graph. The pattern for his transformation can be found using a depth-first method of searching the graph. In some implementations, for simplicity, the search is in post order, i.e., topological sort with producers before consumers and transform the graph in place. When the search finds a matching subtree, it replicates the subtree and replaces the users of the original subtree root with the new subtree root. Other compiler passes fix up replicated and dead code. Other methods of searching the graph for patterns in a computation graph can also be used.

With these two pattern transformations—from the forms reduce(reshape(X)) and reshape(f(reshape(X), broadcast (Y))—group normalization and virtual batch normalization and their derivatives can be done with smaller reshapes and the resulting smaller memory requirements.

For example, an implementation of the group norm is naturally expressed as reduce(reshape(image, [B,H,W,C/G,G]), [1,2,3]).

The shape of the image input, above, is [B,H,W,C], with dimensions for the batch size of the batch of images in the input and the height, width, and channels of the images. The number of groups is G groups. If this expression is executed in this form, it creates a large intermediate tensor on certain hardware platforms and a slow reshape. The above transformations improve the computation by transforming it to the following form:

reduce(reshape(reduce(image, [1, 2]), [B,C/G,G]), [1]), which, for purposes of describing the process of transformation will be represented as:

Y=reshape(X, [B, H, W, C/G, G])
Z=reduce(Y, [1, 2, 3])

The reduce operation reduces tensor Y shaped [B, H, W, C/G, G] on the dimensions specified by the axis tensor [1, 2, 3] and returns a tensor Z. The axis tensor [1, 2, 3] represents the dimensions [H, W, C/G] of tensor Y along which the reduce operation reduces. The reduce operation returns a tensor Z of shape [B, G].

How the parameters of the original pattern are mapped to appropriate inputs to the transformation pattern is described below.

The reduce(reshape(reduce(X, [1, 2]), [B, C/G, G]), [1]) transformation will be represented for the purpose of discussion as:

W=reduce(X, [1, 2])
$Y_2$=reshape (W, [B, C/G, G]
$Z_2$=reduce($Y_2$, [1])

Figure 2:
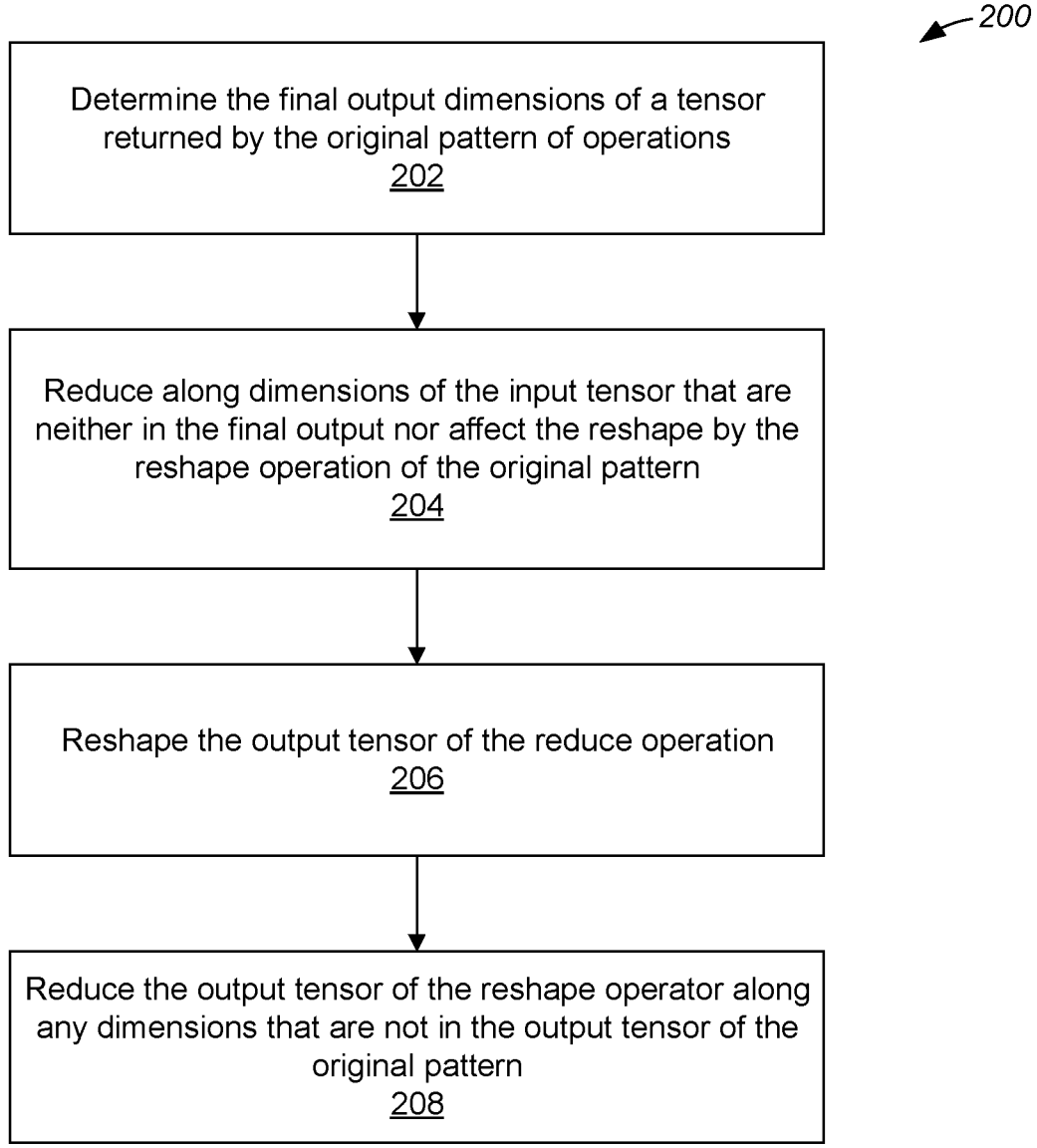
FIG. 2 is a flowchart illustrating an example process of transformation.

FIG. 2 is a flowchart illustrating an example process 200 of transformation. This will be described in reference to the example pattern just described. This process 200 is an example implementation of a transformation (104) described above in reference to FIG. 1.

The process determines the final output dimensions of a tensor returned by the original pattern of operations (202). The final output dimensions are determined by comparing the shape of X to the final output shape. In the example, the original pattern example receives a tensor X shaped [B, H, W, C] and returns a tensor shaped [13, G].

The process reduces along dimensions of the input tensor that are neither in the final output nor affect the reshape by the reshape operation of the original pattern (202). In the example, from the original pattern Y=reshape(X, [B, H, W, C/G, G])
Z=reduce(Y, [1, 2, 3])

the compiler determines from axis tensor input to the reshape operation that the zero-th and third index, i.e., B and C, of tensor X are in the final output and affect the final output, respectively. Therefore, the X is reduced along the first and second dimensions of X, i.e., the H and W dimensions:

W=reduce(X, [1, 2])

The process reshapes the output tensor of the reduce operation (206). The output tensor of the reduce operation, W in the example, is reshaped to the shape of the original pattern but without the dimensions that are not in the final output or transformed. In the original pattern, the third dimension, i.e., C is divided by G, and a fourth dimension, i.e., G is added. The zeroth dimension, i.e., B, is in the final output. Therefore, the reshape operation in the transformation reshapes the reduced tensor to [13, C/G, G]:

$Y_2$=reshape(W, [B, C/G, G])

The process reduces the output tensor of the reshape operation along any dimensions that are not in the output tensor of the original pattern (208). In the example, the original pattern outputs a tensor shaped [13, G]. Therefore, the first index of the output of reshape operation in the transformation is reduced and the reduce operation returns a tensor shaped [B, G]:

$Z_2$=reduce($Y_2$, [1])

The same rules are applied to transform original patterns of the form reshape (operator (reshape(X), broadcast(Y)) into the form operator(X, broadcast(reshape(broadcast (Y)))).

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively or in addition, the carrier may be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   detecting an original pattern of operations in a graph of computational operations on tensors, wherein the original pattern of operations is detected by identifying that an original reshape operation and at least one other operation in the graph are arranged according to a pre-defined pattern, wherein the original pattern of operations returns a final output tensor and takes as input an input tensor, wherein the original reshape operation in the original pattern (i) returns an original tensor and (ii) can be transformed to use less memory;
   transforming the original pattern of operations to a new pattern of operations with one or more reshape operations that return tensors smaller than the original tensor, wherein the new pattern of operations requires less data to be moved to satisfy alignment requirements for vector instructions or vector memory on a target hardware platform than the original pattern of operations; and
   generating executable code that is specific to the target hardware platform and that implements computations represented by the new pattern of operations.

2. The method of claim 1, further comprising:
   deploying the generated code to the target hardware platform for execution.

3. The method of claim 1, wherein transforming the original pattern of operations comprises:
   determining final output dimensions of the final output tensor returned by the original pattern of operations;
   reducing along dimensions of the input tensor that are neither in the final output tensor nor affect the reshape by the original reshape operation to return a first intermediate-result tensor;
   reshaping the first intermediate-result tensor to return a second intermediate-result tensor; and
   reducing the second intermediate-result tensor along any dimensions that are not in dimensions of the final output tensor from the original pattern of operations.

4. The method of claim 1, wherein identifying that the original reshape operation and at least one other operation in the graph are arranged according to a pre-defined pattern comprises identifying that the original tensor returned by the original reshape operation is to be reduced by a reduce operation along one or more dimensions that are not changed by the original reshape operation.

5. The method of claim 1, wherein less data is required to be moved by the new pattern of operations than the original pattern of operations based on the new pattern of operations reducing the input tensor along at least one dimension before performing a new reshape operation so that the number of elements to be reshaped and moved by the new reshape operation in the new pattern of operations is less than the number of elements to be reshaped and moved by the original reshape operation in the original pattern of operations.

6. One or more non-transitory computer-readable storage media encoded with instructions that, when executed by one or more computers, cause the one or more computers to perform actions comprising:
   detecting an original pattern of operations in a graph of computational operations on tensors, wherein the original pattern of operations is detected by identifying that an original reshape operation and at least one other operation in the graph are arranged according to a pre-defined pattern, wherein the original pattern of operations returns a final output tensor and takes as input an input tensor, wherein the original reshape operation in the original pattern (i) returns an original tensor and (ii) can be transformed to use less memory;
   transforming the original pattern of operations to a new pattern of operations with one or more reshape operations that return tensors smaller than the original tensor, wherein the new pattern of operations requires less data to be moved to satisfy alignment requirements for vector instructions or vector memory on a target hardware platform than the original pattern of operations; and
   generating executable code that is specific to the target hardware platform and that implements computations represented by the new pattern of operations.

7. The one or more non-transitory computer-readable storage media of claim 6, wherein the actions further comprise:
   deploying the generated code to the target hardware platform for execution.

8. The one or more non-transitory computer-readable storage media of claim 6, wherein transforming the original pattern of operations comprises:
   determining final output dimensions of the final output tensor returned by the original pattern of operations;
   reducing along dimensions of the input tensor that are neither in the final output tensor nor affect the reshape by the original reshape operation to return a first intermediate-result tensor;
   reshaping the first intermediate-result tensor to return a second intermediate-result tensor; and
   reducing the second intermediate-result tensor along any dimensions that are not in dimensions of the final output tensor from the original pattern of operations.

9. The one or more non-transitory computer-readable storage media of claim 6, wherein identifying that the original reshape operation and at least one other operation in the graph are arranged according to a pre-defined pattern comprises identifying that the original tensor returned by the original reshape operation is to be reduced by a reduce operation along one or more dimensions that are not changed by the original reshape operation.

10. The one or more non-transitory computer-readable storage media of claim 6, wherein less data is required to be moved by the new pattern of operations than the original pattern of operations based on the new pattern of operations reducing the input tensor along at least one dimension before performing a new reshape operation so that the number of elements to be reshaped and moved by the new reshape operation in the new pattern of operations is less than the number of elements to be reshaped and moved by the original reshape operation in the original pattern of operations.

11. A system comprising:
   one or more computers and one or more storage devices on which are stored instructions that are operable, when executed by the one or more computers, to cause the one or more computers to perform actions comprising:
   detecting an original pattern of operations in a graph of computational operations on tensors, wherein the original pattern of operations is detected by identifying that an original reshape operation and at least one other operation in the graph are arranged according to a pre-defined pattern, wherein the original pattern of operations returns a final output tensor and takes as input an input tensor, wherein the original reshape operation in the original pattern (i) returns an original tensor and (ii) can be transformed to use less memory;
   transforming the original pattern of operations to a new pattern of operations with one or more reshape operations that return tensors smaller than the original tensor, wherein the new pattern of operations requires less data to be moved to satisfy alignment requirements for vector instructions or vector memory on a target hardware platform than the original pattern of operations; and
   generating executable code that is specific to the target hardware platform and that implements computations represented by the new pattern of operations.

12. The system of claim 11, wherein the actions further comprise:
   deploying the generated code to the target hardware platform for execution.

13. The system of claim 11, wherein transforming the original pattern of operations comprises:
   determining final output dimensions of the final output tensor returned by the original pattern of operations;
   reducing along dimensions of the input tensor that are neither in the final output tensor nor affect the reshape by the original reshape operation to return a first intermediate-result tensor;

reshaping the first intermediate-result tensor to return a second intermediate-result tensor; and reducing the second intermediate-result tensor along any dimensions that are not in dimensions of the final output tensor from the original pattern of operations.

14. The system of claim 11, wherein identifying that the original reshape operation and at least one other operation in the graph are arranged according to a pre-defined pattern comprises identifying that the original tensor returned by the original reshape operation is to be reduced by a reduce operation along one or more dimensions that are not changed by the original reshape operation.

15. The system of claim 11, wherein less data is required to be moved by the new pattern of operations than the original pattern of operations based on the new pattern of operations reducing the input tensor along at least one dimension before performing a new reshape operation so that the number of elements to be reshaped and moved by the new reshape operation in the new pattern of operations is less than the number of elements to be reshaped and moved by the original reshape operation in the original pattern of operations.

* * * * *